United States Patent [19]

Ueda

[11] Patent Number: 4,710,928
[45] Date of Patent: Dec. 1, 1987

[54] METHOD AND APPARATUS FOR DETECTING THE UNCONTROLLABLE OPERATION OF A CONTROL SYSTEM

[75] Inventor: Akihisa Ueda, Niigata, Japan
[73] Assignee: Hitachi, Ltd., Tokyo, Japan
[21] Appl. No.: 797,894
[22] Filed: Nov. 14, 1985

[30] Foreign Application Priority Data

Nov. 16, 1984 [JP] Japan ................ 59-240433

[51] Int. Cl.⁴ ............................... G06F 11/32
[52] U.S. Cl. .......................... 371/16; 371/29; 371/62
[58] Field of Search ............ 371/16, 12, 66, 62, 371/61, 29; 364/200, 900, 184, 186, 140

[56] References Cited

U.S. PATENT DOCUMENTS

| | | |
|---|---|---|
| 4,570,261 | 2/1986 | Maher ........................... 371/16 |
| 4,586,179 | 4/1986 | Sizazi ........................... 371/62 |
| 4,592,053 | 5/1986 | Matsuura ...................... 371/16 |
| 4,594,685 | 6/1986 | Owens ........................... 371/16 |
| 4,598,355 | 7/1986 | Shepler .......................... 371/62 |
| 4,611,281 | 9/1986 | Suko .............................. 371/16 |
| 4,618,953 | 10/1986 | Daniels ......................... 371/62 |

*Primary Examiner*—Michael R. Fleming
*Attorney, Agent, or Firm*—Fay, Sharpe, Beall, Fagan, Minnich & McKee

[57] ABSTRACT

A system arrangement for detecting the uncontrollable operation of a control system includes an interrupt signal generating circuit which issues the interrupt signal to the central processing unit (CPU) on a hardware basis so that the CPU is interrupted at a constant interval even during the uncontrollable operation of the control system. The CPU responds to the interrupt signal to initiate the interrupt processing routine, which then detects the state of uncontrollable operation basing on the trace of the computational processes carried out by the CPU.

9 Claims, 6 Drawing Figures

METHOD AND APPARATUS FOR DETECTING THE UNCONTROLLABLE OPERATION OF A CONTROL SYSTEM

BACKGROUND OF THE INVENTION

This invention relates to a method and apparatus for detecting the uncontrollable operation of a microcomputer-based control system.

DESCRIPTION OF THE PRIOR ART

A microcomputer application system comprises a control apparatus which includes a system program ROM memory for storing a sequence of processes for the overall system, a central processing unit (CPU) for implementing the comutation and control in accordance with the contents of the ROM, a RAM memory for use as working registers for computation and control and also as a memory of various data, an input section for receiving the internal and external signals, and an output section for outputting the computational and control result produced by the CPU; and an interface for connecting the control apparatus with a load which is controlled by the output signal provided by the output section.

In the system arranged as described above, if the CPU were to fail in the normal control, i.e., falls into uncontrollable operation, due to a strong disturbing noise or the failure of a component part, the output circuit would provide a random output signal. This can be a matter of safety for some load, particularly when the system is loaded with motors, solenoids and the like to control the operation of a machine tool, conveyor machine, automatic assembling machine or the like. To cope with this matter, various safety measures have been taken depending on each system size. The monitor timer (watch dog timer) system is one of them. This system operates such that the normally running CPU produces pulses periodically at a certain time interval a between a given computational process and the next one so as to trigger a pulse generator to produce a pulse signal with a certain duration with each of the periodic pulses and to interrupt an operation of a latch circuit in the presence of the pulse signal of the pulse generator, while a different clock signal is applied to the latch circuit periodically at a time interval b (where a>b). In the event of a CPU abnormality, the system falls into an uncontrollable operation without terminating the specified computation, causing the absence of the pulse signal at interval 'a' and subsequently the absence of the pulse signal. Then, the latch circuit operates to produce an abnormality detect signal at the rising edge of one of the clock signals produced at the time interval b. The above-mentioned conventional system, however, needs the generation of various signals for detecting CPU abnormalities, resulting in a complex circuit arrangement, and in addition the need of timing adjustment for the pulse signal generator involves various measures in both the hardware and software design for the abnormality detecting function, causing the system to be extremely disadvantageous in an economical sense.

SUMMARY OF THE INVENTION

In view of the foregoing prior art deficiencies, the present invention contempletes providing an apparatus for detecting the uncontrollable operation of a control system capable of detecting easily and surely abnormalities of the central processing unit in the system by utilization of the existing circuit and addition of a minimal circuit and associated software.

The apparatus of the present invention includes an independent interrupt signal generating circuit which generates interrupt signals periodically at a constant time interval regardless of whether the uncontrollable system operation occurs or not. Accordingly, once an interrupt signal is issued the system enters the interrupt processing routine even in state of uncontrollable operation. The interrupt signals are applied to the central processing unit periodically at a constant interval, so that the interrupt processing routine is initiated with each interrupt signal. Through the operation of the interrupt processing routine, the state of uncontrollable operation is detected basing on the trace of computational processes carried out by the central processing unit, whereby the aforementioned objective of this invention is accomplished.

DESCRIPTION OF THE PREFERRED EMBODIMENT

Figure 1:
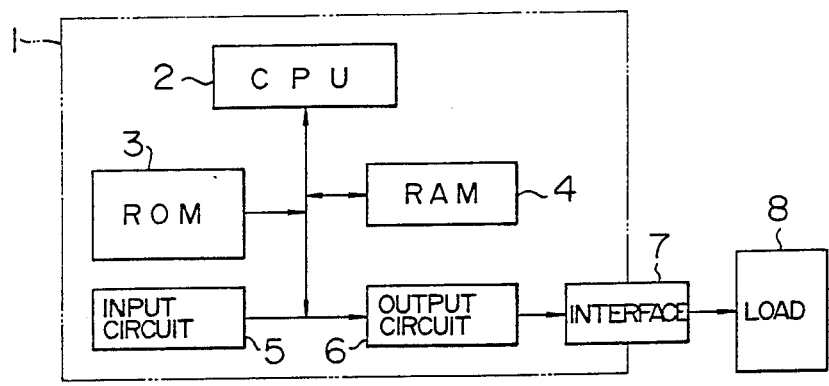
FIG. 1 is a block diagram of a control system.

Generally, a microcomputer-based control system is arranged as shown in FIG. 1. The control system 1 includes a system program ROM memory 3 for storing a sequence of processes for the overall system, a central processing unit (CPU) 2 for implementing the computation and control in accordance with the contents of the ROM 3, a RAM memory 4 for use as working registers for the computation and control operation and also as a memory of various data, an input section 5 for receiving internal and external signals, and an output section 6 for outputting the result of computation produced by the CPU 2. The control system 1 is connected through an interface 7 with an external load 8 which is controlled by the output signal provided by the output section 6 through the interface 7.

In the system arranged as described above, if the CPU 2 were running out of the normal control, i.e., runs into uncontrollable operation, due to a strong disturbing noise or the failure of a component part, the output section 6 will provide random output signals. This may involve serious problems in safety for same load, particularly when the system is loaded with motors, solenoids and the like for controlling the operation of a machine tool, conveyor machine, automatic assembling machine, or the like. To cope with this matter, various safety measures are taken depending on each system size. The monitor timer (watch dog timer) system is one of them.

Figure 2:
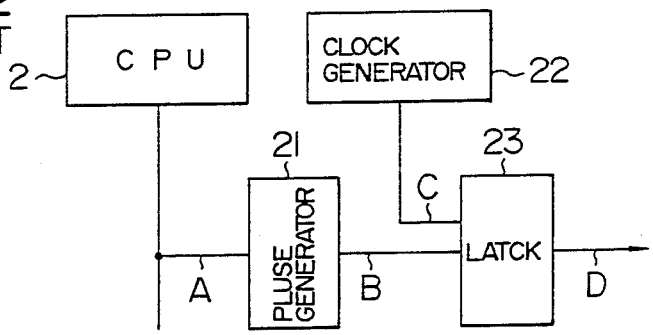
FIG. 2 is a block diagram showing an arrangement of the conventional monitor timer.
Figure 3:
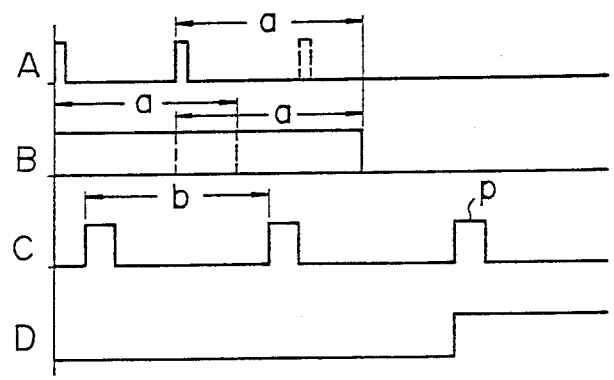
FIG. 3 is a timing chart for the conventional monitor timer.

FIG. 2 shows the monitor timer (watch dog timer) system. The system operates such that the normally running CPU 2 produces pulses (A) periodically at a certain time interval between a give computational process and the next one as shown in FIG. 3 and each of the pulses A triggers a pulse generator 21 to produce a signal (B) casting for a certain time interval a, which is applied to a latch circuit 23 for stopping its latch operation in the presence of the signal B, while pulse signals C produced from a pulse generator 22 periodically at a time interval b (a>b) are also supplied to the latch circuit 23. In the event of a CPU abnormality, the system runs into an uncontrollable operation without terminating the specified computation, causing the absence of the signal (A) and subsequently the absence of the signal (B). Then, the latch circuit operates to produce an abnormality detect signal (D) at the rising edge of one of the signals (C).

Namely, in a state of abnormality of the CPU 2, the pulse (A) fails to arise as shown by the dashed line in FIG. 3. This releases the latch circuit 23 from halting, causing it to latch the first one P of the signals (C) following the release, and the abnormality signal (D) is produced by the latch circuit 23. The system is designed to respond to this signal for taking action against the uncontrollable operation.

The above-mentioned conventional system, however, needs the pulse generator 21, clock generator 22 and latch circuit 23 for detecting abnormalities of the CPU 2, resulting in a complex circuit arrangement, and in addition the need of timing adjustment for each signal generator involves various measures in both the hardware and software design for the abnormality detecting function, causing the system to be extremely disadvantageous in an economical sense.

Next, an embodiment of the present invention will be described with reference to FIGS. 4, 5 and 6, in which like portions to those of the conventional system shown in FIG. 2 are referred to by the common symbols.

Figure 4:
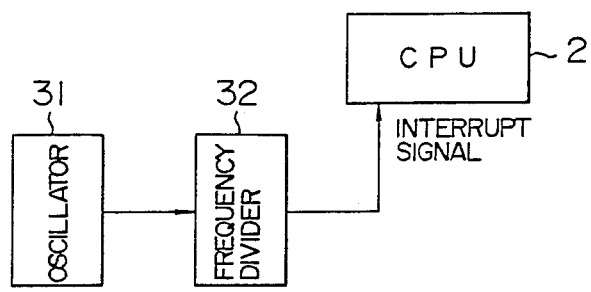
FIG. 4 is a block diagram of the interrupt signal generating circuit embodying the present invention.
Figure 5:
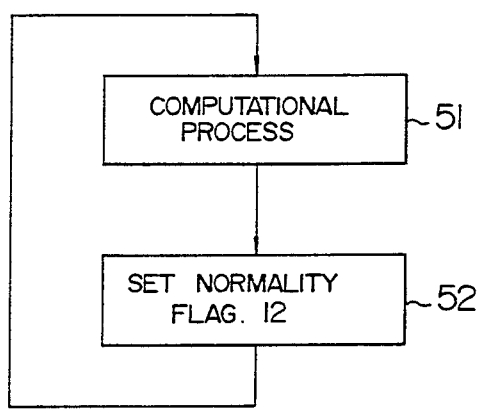
FIG. 5 is a flowchart showing the normal process carried out by the central processing unit in FIG. 4.

FIG. 4 shows an interrupt signal generating circuit, in which, an oscillator 31 has its output connected to the input of a frequency divider 32, whose output is connected to the interrupt input of the central processing unit 2. The oscillator 31 generates a fundamental clock, at a frequency of, for example, 1 MHz, which is frequency divided by the divider 32 to produce the clock at a frequency, for example, of 1000-100 Hz and it is supplied to the central processing unit 2. The clock output from the frequency divider 32 is used as the reference pulse for the timer operation, and in this embodiment it is utilized as the interrupt signal to the central processing unit 2.

The central processing unit (CPU) 2 is designed such that after a sequence of computations (step 51) it sets a normality flag 12 indicating that the computational processes (step 52) have been normally executed. The normality flag 12 is set at every termination of a sequence of computational processes. Accordingly, when a sequence of computational processes has terminated normally, the norality flag 12 is set, and these operations take place cyclically.

In case a sequence of computational processes has not terminated normally, the normality flag 12 is not set. Although in this embodiment no indication is displayed in response to the failure of normal termination of the computational processes arrangement may be made such that an abnormality flag is set in this case.

After a sequence of computational processes has completed and the normality flag has been set, the interrupt signal is delivered from the frequency divider 32 to the central processing unit 2. For this timing relationship, the interrupt signals are produced periodically at a period of time longer than the period of cyclic operation including the computational processes and setting of the normality flag.

Figure 6:
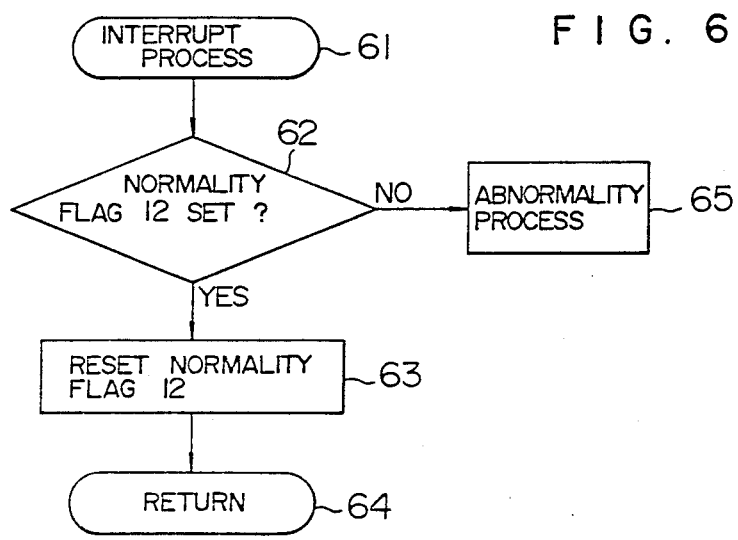
FIG. 6 is a flowchart showing the interrupt process.

Upon receiving the interrupt signal (step 61), the central processing unit 2 starts the interrupt processing routine as shown in FIG. 6. The interrupt process first tests as to whether the normality flag 12 has been set upon reception of the interrupt signal (step 62). When the normality flag 12 is found set, the central processing unit 2 is determined to be normal and the normality flag 12 is reset (step 63). If the normality flag 12 is not set, the central processing unit 2 is determined to be abnormal, and the system is operated to execute the abnormality process (step 65). The periodical interrupt processes are carried out at a time interval larger than the time interval for carrying out any given computational process. The abnormality process may include the close down of the control system, and it is programmed in advance.

Next, the operation of the apparatus for detecting the uncontrollable system operation will be described in detail.

In the cyclic operation of the central processing unit 2, after completion of a sequence of computational processes, the normality flag 12 is set (steps 51 and 52). If the interrupt signal is issued to the central processing unit 2, it suspends the computational process by way of the hardware procedure and proceeds to the interrupt process (step 61). The interrupt process tests the noramlity flag to determine the normal operation of the system as indicated by the set state of the flag. Upon confirmation of the normal system operation, the interrupt process resets the noramlity flag 12, so that it is ready for the monitoring of the next operation cycle, to complete the interrupt process (step 63), and transfers control back to the usual process (step 64).

If, on the other hand, a sequence of computational processes has not terminated noramlly, the noramlity flag 12 is not set. Even in this case, the system enters the interrupt process on a hardware basis in response to the interrupt signal, and the interrupt process takes place correctly. Namely, it can be found that the noramlity flag 12 is left reset by testing the flag, and the abnormality of the central processing unit 2 can be detected surely, and in this case the abnormality process will take place (step 65).

Although a sequence of computational processes and setting of the normality flag 12 are carried out in the period of one interrupt cycle, the computational process sequence may take place twice or more within the period of one interrupt cycle in some cases. In this cases, the normality flag is set upon termination of the first computational process sequence and the flag state is retained until the termination of the second computational process sequence at which time the state of the flag is updated depending on whether the second sequence has been terminated normally or not.

The interrupt signal is produced by utilization of the oscillator 31 and frequency divider 32, the former being used for generating the fundamental clock for the CPU, and only additional hardware requirement is the frequency divider 32. Moreover, setting of the normality flag 12 and resetting of the flag in the interrupt routine can be implemented by a simple software arrangement. Accordingly, additional requirements in the hardware and software design can be minimized as compared with the conventional system using a complex circuit arrangement.

It should be noted in the above embodiment that the combination of the oscillator 31 and frequency divider 32 may be replaced with an oscillator which produces a clock signal of the same frequency as provided by the frequency divider 32.

It will be appreciated from the foregoing embodiment that the present invention utilizes the existing circuit and is capable of surely detecting abnormalities of the central processing unit by addition of a minimal circuit and software design. The system of the invention prevents the uncontrollable operation of the control system in the event of abnormality at a minimal cost.

I claim:

1. An apparatus for detecting uncontrollable operation of a control system used for controlling a load, said apparatus comprising:
   memory means for storing data relating to a given computational process;
   central processing means for periodically executing the computational process based on the contents of said memory means and including means for setting a normality flag each time the execution of the computational process has been normally terminated;
   output means for outputting an output signal based on the result of execution of the computational process, said output signal being applied to the load;
   means for generating and applying to said central processing means an interrupt signal periodically at a predetermined time interval which is longer than a time interval required for said central processing means to execute normally the computational process and then set the normality flag; and
   means provided to said central processing means for checking, in response to said interrupt signal, whether the normality flag is set and for resetting the normality flag, if the flag is set and executing an abnormality process if the normality flag is not set.

2. An apparatus according to claim 1, wherein said interrupt signal generating means comprises means for dividing a frequency of a fundamental clock signal used for said central processing means, thereby producing a frequency-divided clock signal to serve as the interrupt signal.

3. An apparatus according to claim 2, wherein said time interval at which said interrupt singal is produced periodically is determined to be sufficiently longer to allow said central processing means to execute two time the computational process during the time interval and the normality flag is set upon a normal termination of the first time execution of the computational process and maintained until termination of the second time execution of the computational process.

4. An apparatus for detecting uncontrollable operation of a control system used for controlling a load, said apparatus comprising:
   memory means for storing data relating to a given computational process;
   central processing means for periodically executing the computational process based on the contents of said memory means and including means for providing a predetermined indication each time the execution of the computational process has been normally terminated;
   output means for outputting an output signal based on the result of execution of the computational process, said output signal being used for controlling the load;
   means for generating and applying to said central processing means an interrupt signal periodically at a predetermiend time interval which is determined to be sufficient longer to allow said central processing means to execute at least one time the computational process during the time interval; and
   means provided to said central processing means for checking, in response to said interrupt signal, whether said predetermined indication is present and for cancelling said indication, in the presence of said indication and executing an abnormality process in the absence of said indication.

5. An apparatus according to claim 4, wherein said time interval at which said interrupt singal is procduced periodically is determined to be sufficiently longer to allow said central processing means to execute two time the computational process during the time interval and said predetermined indication is provided upon a normal termination of the first time execution of the computational process and maintained until termination of the second time execution of the computational process.

6. A method for detecting uncontrollable operations of a control system which executes periodically a computational process thereby producing an output signal based on the results of execution of the computational process, said output signal being used for controlling a load, said method comprising the steps of:
   setting a normality flag each time the execution of the computational process has been normally terminated;
   generating an interrupt signal periodically at a time interval which is longer than a time interval required for the control system to execute normally the computational process;
   executing, in response to said interrupt signal, an interrupt process routine in which it is checked whether the normality flag is set; and
   resetting the normality flag, if the normality flag is set and executing an abnormality process, if the normality flag is not set.

7. A method according to claim 6, further comprising the step of initiating the next time execution of the computational process after resetting the normality flag.

8. A method according to claim 6, wherein said time interval at which the interrupt signal is periodically generated is determined to be sufficiently longer to allow the computational process to be executed two times during the time interval and the normality flag is set upon normal termination of the first time execution of the computational process and maintained until termination of the second time execution of the computational process.

9. A method according to claim 6, wherein the interrupt process routine is carried out specifically by hardware.

* * * * *